(12) United States Patent
Bourderionnet et al.

(10) Patent No.: US 9,812,840 B2
(45) Date of Patent: Nov. 7, 2017

(54) SYSTEM FOR PHASING A LARGE NUMBER OF LASER SOURCES

(71) Applicant: THALES, Courbevoie (FR)

(72) Inventors: Jérôme Bourderionnet, Palaiseau (FR); Arnaud Brignon, Palaiseau (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/313,542

(22) PCT Filed: May 26, 2015

(86) PCT No.: PCT/EP2015/061524
§ 371 (c)(1),
(2) Date: Nov. 22, 2016

(87) PCT Pub. No.: WO2015/181130
PCT Pub. Date: Dec. 3, 2015

(65) Prior Publication Data
US 2017/0201063 A1 Jul. 13, 2017

(30) Foreign Application Priority Data
May 28, 2014 (FR) ..................... 14 01222

(51) Int. Cl.
*H01S 3/13* (2006.01)
*H01S 3/10* (2006.01)
(Continued)

(52) U.S. Cl.
CPC ........ *H01S 3/1307* (2013.01); *H01S 3/08009* (2013.01); *H01S 3/1024* (2013.01); *H01S 3/10053* (2013.01); *H01S 3/1305* (2013.01)

(58) Field of Classification Search
CPC .. H01S 3/10053; H01S 3/1305; H01S 3/1307; H01S 3/08009; H01S 3/1024
See application file for complete search history.

(56) References Cited

U.S. PATENT DOCUMENTS

| 4,649,351 A | 3/1987 | Veldkamp et al. |
| 5,042,922 A * | 8/1991 | Pepper ..................... G01J 9/00 |
| | | 349/17 |

(Continued)

OTHER PUBLICATIONS

J. N. Cederquist et al., "Wave-front phase estimation from Fourier intensity measurements," Journal of Optical Society of America, vol. 6, No. 7, Jul. 1989, pp. 1021-1026.
J. Lhermite et al., "Coherent combining of 49 laser beams from a multiple core optical fibre by a spatial light modulator," Optics Express, vol. 18, No. 5, Mar. 1, 2010, pp. 4783-4789, XP002734919.

(Continued)

*Primary Examiner* — Kinam Park
(74) *Attorney, Agent, or Firm* — Baker & Hostetler LLP

(57) ABSTRACT

A system for phasing periodically configured laser sources, which comprises: means for collimating and directing the beams arising from the sources onto a combining diffractive optical element with a periodic phase grating, with an angle of incidence that differs from one beam to the next, these angles of incidence being determined according to the period of the grating; means for controlling the phases of the sources based on a negative feedback signal arising from the combined beams; means for drawing off a fraction of the combined beams; on the path of this fraction of the beams, a Fourier lens, with the combining diffractive optical element in its object plane; a matrix of detectors in the image plane of the Fourier lens, capable of detecting intensity distributions; means for calculating the negative feedback signal based on these intensity distributions.

7 Claims, 4 Drawing Sheets

(51) Int. Cl.
*H01S 3/102* (2006.01)
*H01S 3/08* (2006.01)

(56) References Cited

U.S. PATENT DOCUMENTS

| | | | | |
|---|---|---|---|---|
| 5,090,795 | A * | 2/1992 | O'Meara | G02B 26/06 |
| | | | | 348/E9.027 |
| 6,370,175 | B1 * | 4/2002 | Ikeda | H04N 1/40037 |
| | | | | 347/236 |
| 2008/0094605 | A1 * | 4/2008 | Drodofsky | G01S 7/4814 |
| | | | | 356/4.01 |
| 2009/0185176 | A1 | 7/2009 | Livingston et al. | |
| 2009/0185590 | A1 * | 7/2009 | Livingston | H01S 3/2308 |
| | | | | 372/29.023 |
| 2014/0140652 | A1 * | 5/2014 | Aflatouni | G02F 1/011 |
| | | | | 385/3 |

OTHER PUBLICATIONS

J. Bourderionnet et al., "Collective coherent phase combining of 64 fibres," Optics Express, vol. 19, No. 18, Aug. 29, 2011, pp. 17053-17058, XP002692038.

R. G. Paxman et al., "Optical misalignment sensing and image reconstruction using phase diversity," J. Opt. Soc. Am. A, vol. 5, No. 6, Jun. 1988, pp. 914-923.

R. G. Paxman et al., "Joint estimation of object and aberrations by using phase diversity," J. Opt. Soc. Am. A, vol. 9, vol. 7, Jul. 1992, pp. 1072-1085.

J. Markham et al., "Parametric blind deconvolution: a robust method for the simultaneous estimation of image and blur," J. Opt. Soc. Am. A, vol. 16, No. 10, Oct. 1999, pp. 2377-2391.

J.R. Fienup, "Phase retrieval algorithms: a comparison," Applied Optics vol. 21, No. 15, Aug. 1, 1982, pp. 2758-2769.

* cited by examiner

| Nature of the error signal | Scalar | Vector | | |
|---|---|---|---|---|
| Method | Hill climbing | LOCSET | OHD | Direct interferometric measurement |
| No. detectors (for M sources) | 1 | 1 | M | > 2M |
| Bandwidth | Varies by 1/M | > 10kHz | > 10kHz | Limited by camera (potentially > 1 - 10 kHz) |
| Calibration required | No | No | Yes | Yes |
| Needs RF electronics (affects cost) | No | Yes | Yes | No |
| Needs optical reference | No | No | Yes | Not necessarily (QWLSI in [11]) |
| Best suited combining type | Filled aperture | Filled aperture | Tiled aperture | Tiled aperture |

FIG. 4

SYSTEM FOR PHASING A LARGE NUMBER OF LASER SOURCES

CROSS-REFERENCE TO RELATED APPLICATIONS

This application is a National Stage of International patent application PCT/EP2015/061524, filed on May 26, 2015, which claims priority to foreign French patent application No. FR 1401222, filed on May 28, 2014, the disclosures of which are incorporated by reference in their entirety.

FIELD OF THE INVENTION

The field of the invention is that of the coherent combining of a large number of elementary laser sources.

BACKGROUND

The coherent combining of laser sources is particularly applicable to the production of high-power laser sources and/or, in the case of ultra-short pulsed sources, high-energy laser sources, for example with a pulse width of less than a picosecond.

The obtention of high-power (or high-energy) and high-luminance laser sources is currently limited by the flux stability of gain materials. One solution to this problem is to distribute amplification across multiple gain media in parallel. This requires the laser beams output from each gain medium to be in phase so as to ensure optimum coherent combining of all of the laser beams. It is therefore necessary to dynamically compensate for the delays introduced across a large number M of laser beams due to propagation through an assembly of gain media (fiber amplifiers for example) connected in parallel. Once phase-locked, the M nascent laser beams constructively interfere and thus form a source whose luminance is M times greater than that of an elementary amplifier, while retaining its beam-like quality (limited by diffraction in the case of single-mode fibers, for example). It is therefore a question of setting up as many phase-locked loops as there are emitters.

The architectures for phasing laser sources may be classified according to multiple criteria. The first is the manner in which the beams are spatially combined, or superposed. Two families are thus distinguished:

Tiled-aperture combining: the M laser beams are collimated and have parallel directions of propagation. This combining mode is the optical equivalent of a radar beamforming antenna. Tiled aperture has then an intense main lobe and parasitic side lobes.

Filled-aperture combining: the M beams are superposed in the near field by using polarizers or a diffractive optical element (DOE). The advantage of the filled-aperture combining method is its efficiency, since in this case there are no side lobes in the far field.

The nature of the error signal follows, along with the processing that will make it possible to counteract it across the phases between laser sources, and to optimize their coherent addition. Essentially four methods for the coherent combing of laser beams are distinguished, classed according to the quantity of information contained in the negative feedback signal:

The method referred to as the "hill-climbing" method: the error signal is simply formed by drawing off a fraction of the combined energy, which is maximized by varying the phases of the M channels (beams) to be combined. This technique is based on a gradient-based optimization algorithm with M−1 dimensions. The complexity rests, in this instance, on the processing algorithm, the error signal, which is a scalar signal, is extremely simple and low cost. The drawback of this method is the bandwidth of the loop, which varies by 1/M. This method therefore lends itself more to a small number of combined beams, typically fewer than 10.

The method referred to as the OHD method, for "optical heterodyne detection". In this method, the error signal, which is composed of the measurement of the phase of each emitter with respect to a reference beam, is a vector signal; one detector per channel is used. The M measurements are taken in parallel via heterodyne mixing and demodulation. The drawbacks of this method are:

using RF components, which increases the cost per channel;

having recourse to a reference beam;

the error signal, which is measured before combining and which does not guarantee optimum combining quality: it does not make it possible to compensate for fluctuations in phase between the phase measurement plane and the combining plane. It is therefore necessary for the system to be calibrated.

The method referred to as the LOCSET, or synchronous multi-dither, method. As for the hill-climbing method, this method uses a fraction of the combined energy as an error signal, but in this case, the contributions from the various channels are identified by "frequency-marking" each channel via RF modulation at a frequency specific thereto. The error signal for each beam is then obtained through heterodyne mixing using a reference beam. This method is advantageous since it requires only one detector, and the availability of rapid-phase modulators allows a large number of channels to be envisaged. On the other hand, it requires a large number of RF components in the negative feedback loop (mixers, modulators, etc.), thereby considerably increasing the cost per channel of the system. A similar signal is obtained by temporally sequentially modulating each of the beams, at the same frequency in this instance, but with a negative impact on the bandwidth of the system.

The method of directly measuring the phases between emitters, for which the error signal is a map of the phases extracted from the interferogram of the beams to be combined, interfering either with one another or with a reference beam. This direct interferometric measurement method is collective: all of the phases are obtained through the recording of a single image by a matrix sensor, and it therefore lends itself perfectly to a large number of emitters. The cost of the imager used is to be divided by the number of channels and is therefore not decisive. The bandwidth of the system may, on the other hand, be limited by the sensor used, especially in the infrared. This is not a fundamental limit, however. Lastly, as for the OHD method, the phase is measured before combining; it does not make it possible to compensate for fluctuations in phase between the phase measurement plane and the combining plane and therefore does not guarantee optimum combining quality. It is therefore necessary for the system to be calibrated.

FIG. 4 summarizes the prior art of coherent combining techniques. The grayed cells indicate the negative points of each method.

There is therefore currently no existing architecture for the coherent combining of laser beams that simultaneously satisfies the conditions of a loop bandwidth >1 kHz, a number of beams that is potentially 100, 1000 or even higher, operation without calibration (error signal in the combining plane) and low cost.

SUMMARY OF THE INVENTION

The context of the invention is that of a system in which the laser beams are spatially combined using a diffractive optical element (DOE). The system according to the invention is based on an original use of this diffractive element which allows, in addition to providing for the spatial combining of the beams, an innovative error signal to be generated that makes it possible to compensate for the phase differences between laser sources. This error signal is calculated from the intensities diffracted by the higher orders of the diffractive combining element. Such an error signal allows all of the aforementioned conditions to be fulfilled.

More specifically, a subject of the invention is a system for phasing M laser sources of the same wavelength centered around $\lambda_0$, having a periodic spatial configuration, M being an integer >2, which comprises:

means for collimating and directing the M beams arising from the sources onto a combining diffractive optical element with a periodic phase grating, with an angle of incidence that differs from one beam to the next, these angles of incidence being determined according to the period of the grating; and means for controlling the phases of said sources based on a negative feedback signal arising from the combined beams.

It is mainly characterized in that it comprises:

means for drawing off a fraction of the combined beams;

on the path of this fraction of the combined beams, a Fourier lens having an object plane and an image plane, with the combining diffractive optical element in its object plane;

a matrix of detectors in the image plane of the Fourier lens, capable of detecting intensity distributions of the fraction of the combined beams;

means for calculating the negative feedback signal based on these intensity distributions.

A vector error signal (whose size is given by the number of measured higher orders of diffraction) is indeed obtained, but without having to use RF components. Moreover, the system requires, by its principle, no calibration, since the optimization does not target the phase locking (see the OHD and direct interferometric measurement techniques) but rather the combined intensity directly (by minimizing the intensity of the higher orders).

The following advantages are therefore combined:

As for the LOCSET and hill-climbing methods, the error signal is generated in the combining plane, hence no calibration is required.

The error signal is composed of a set of non-redundant measurements which allow the negative feedback signal to be generated via a simple processing operation.

The cost of the system per channel (beam) is relatively low since it does not involve any RF element and only one detector per channel is required.

The system is compatible with a large number of channels, and with a bandwidth of >1 kHz.

According to one feature of the invention, the means for calculating the negative feedback signal comprise means for calculating the product of the distribution of the intensities detected in the plane of the matrix of detectors through the inverse of a matrix of size (2M−1)×(2M−1) if M is odd, and 2M×2M if M is even, defined by coefficients obtained through developing the phase of the combining diffractive optical element, taken over one period, into Fourier series. Typically, M>100.

Preferably, the sources are arranged in a one- or two-dimensional spatial configuration.

According to one preferred embodiment of the invention, the beams arising from the laser sources have one and the same exit plane, and the system then comprises another Fourier lens having an object plane in which the exit plane of the laser sources is located and an image plane in which the combining diffractive optical element is located.

BRIEF DESCRIPTION OF THE DRAWINGS

Other features and advantages of the invention will become apparent on reading the detailed description which follows, given by way of non-limiting example and with reference to the appended drawings in which:

FIG. 4 summarizes the prior art of coherent combining techniques. The grayed cells indicate the negative points of each method.

The same elements bear the same references from one figure to the next.

DETAILED DESCRIPTION

Figure 1:
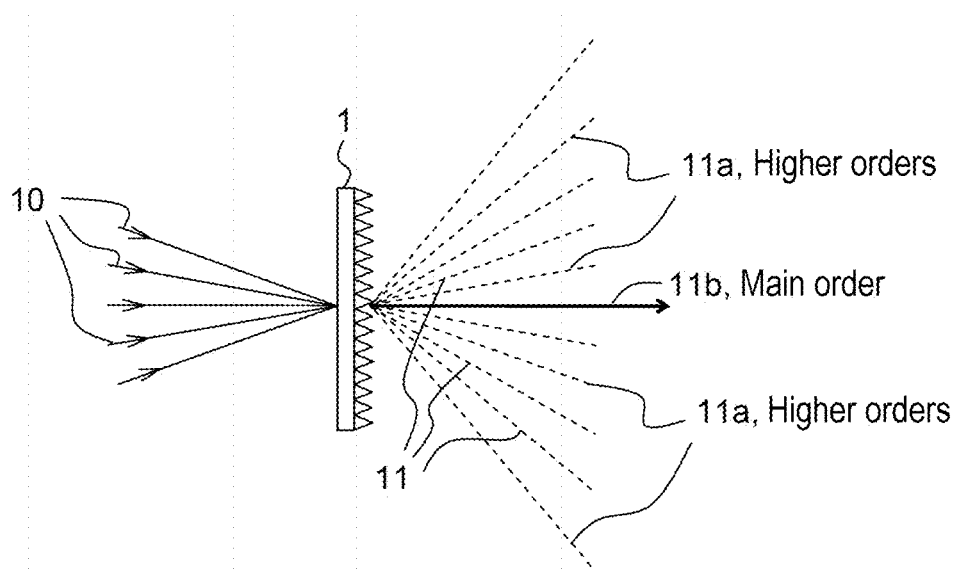
FIG. 1 schematically illustrates the use of a diffractive optical element as a means for combining beams from "M to 1" (5 to 1 in the example of the figure)

The context of the invention is that of a system which, first of all, is based on the use of a diffractive optical element 1 (or DOE) as a means for combining various laser beams 10, as shown in the example of FIG. 1. The laser beams 10 are incident on the DOE 1 at an angle defined by the spatial period of the DOE. Once the beams are phase-locked, and with optimum phase distribution (set by the DOE), then all of the beams constructively interfere at order 0 (=main order) of the DOE 11b, and destructively interfere at the higher orders 11a.

Figure 2:
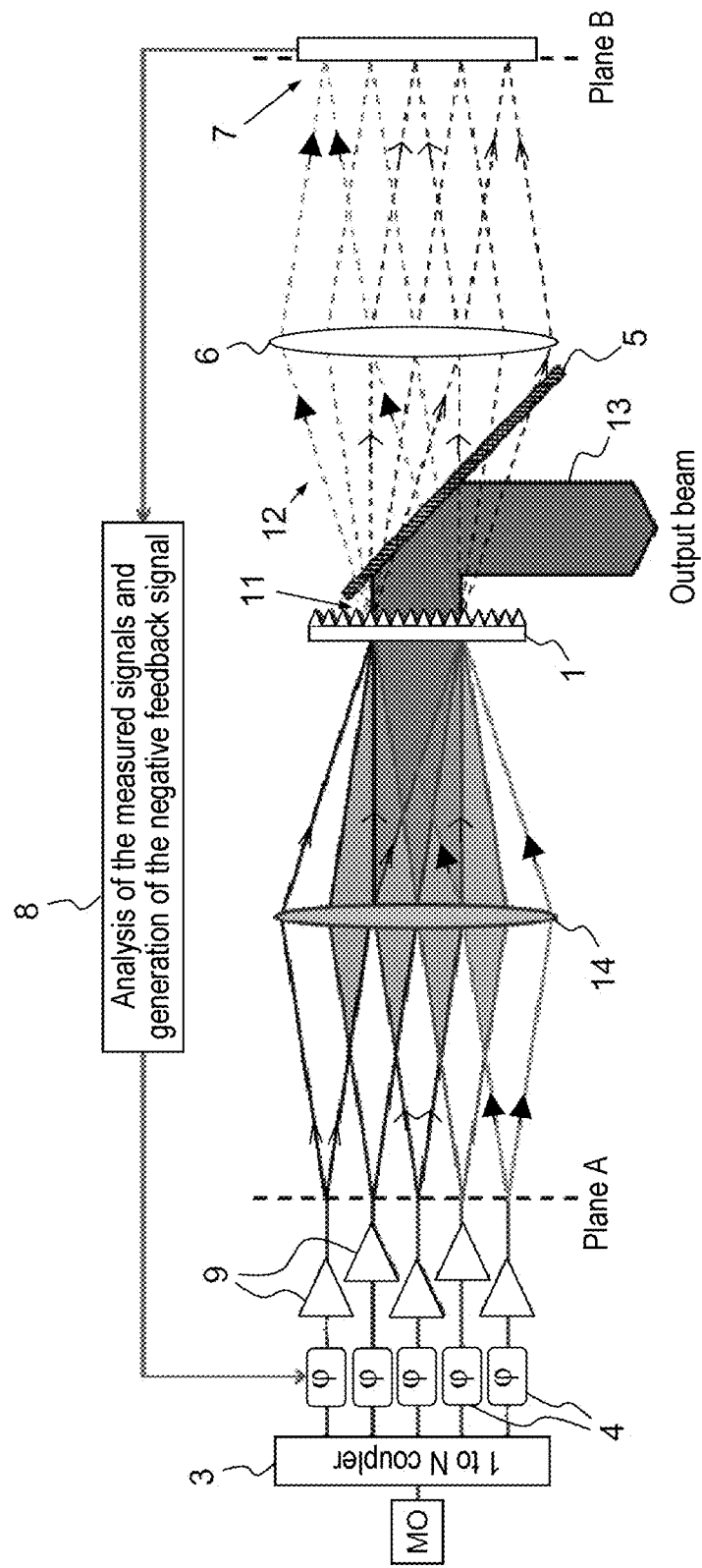
FIG. 2 schematically shows an exemplary phasing system according to the invention.

The principle of the invention is to use the intensity distribution 11a diffracted at the higher orders of the DOE as an error signal in order to optimize combining, as shown in the example of FIG. 2. In our approach, as for the LOCSET and hill-climbing techniques, the error signal is measured at the end of the chain (i.e. after the DOE), thereby allowing all of the interference to which the beams are subject to be taken into account. It will be noted that if the example of FIG. 2 shows a linear arrangement of laser beams, and hence a one-dimensional DOE, the proposed solution nonetheless being equivalently applied to a two-dimensional arrangement of laser beams and a two-dimensional DOE.

A system for phasing M laser sources according to the invention is described, with reference to FIG. 2. The M laser sources have the same wavelength centered around $\lambda_0$. These laser sources may be pulsed sources; the pulse width may also be less than $10^{-12}$ s.

The system comprises:

M phase modulators: one modulator 4 at the output of each laser source.

A combining DOE 1 with a phase grating of predetermined spatial period, located in the image plane of a Fourier lens 14: the M beams arising from the modulators are directed onto the DOE 1 by this Fourier lens 14. Each beam strikes the DOE at a specific angle of incidence defined by the spatial period of the DOE.

Means for drawing off a fraction 12 of the combined beams 11, which may be a high-reflectivity mirror 5 (drawing off 1%, for example) or a polarizing cube beam splitter. It is preferably chosen to draw off <1/M. The other fraction of the combined beams forms the output beam 13 of the system.

A second Fourier lens 6 in the object plane in which the combining DOE 1 is located.

A matrix of detectors 7 in the image plane (=plane B) of the second Fourier lens 6, capable of detecting the intensity distributions 11b, 11a of the fraction of the orders of diffraction of the beams combined by the DOE 1.

Means 8 for calculating the negative feedback signal from these distributions in the plane of the matrix of detectors. These calculation means 8 are connected to the M phase modulators 4 in order to control them.

The M beams may be directed onto the DOE 1 in various ways. Upstream of the DOE, the system comprises, for example:

one and the same master oscillator 2 connected to a "1 to M" coupler 3 so as to generate the M laser sources;

potentially, M amplifiers 9 respectively connected to the phase modulators 4.

The exit plane (=plane A) of the M laser beams (arising from the amplifiers or the modulators) is located in the object plane of the Fourier lens 14, in a spatially periodic configuration of pitch P shown in FIG. 2.

According to one alternative, the M laser sources have a collimating lens associated with each source and are directly positioned in a periodic angular and spatial configuration, such that the beams strike the combining DOE at a specific angle of incidence defined by the spatial period of the DOE.

The means 8 for calculating the negative feedback signal are now considered. The problem to be solved by these calculation means is therefore posed thus:

The variable of the problem is the spatial distribution of the electromagnetic field formed from the superposition of the electromagnetic fields arising from each of the laser sources.

The intensity distributions of the electromagnetic field are assumed to be known in two separate planes: a uniform (or measured) distribution $I_A$ in the exit plane of the sources (plane A in FIG. 2) and a distribution $I_B$ measured after combining by the DOE (in plane B in FIG. 2).

The aim is to calculate the distributions of phases $\phi_A$ and $\phi_B$ in planes A and such that the electromagnetic field $\sqrt{I_A}e^{j\phi_A}$ digitally propagated from A to gives $\sqrt{I_B}e^{j\phi_B}$.

This problem is akin to that of the measurement of phase aberrations from image distortions of an intensity encountered, for example, in astronomy. Exemplary methods for solving this problem may be found in the literature. The following publications may be cited: R. G. Paxman and J. R. Fienup, "Optical misalignment sensing and image reconstruction using phase diversity", J. Opt. Soc. Am. A 5, 914-923 (1988), or J. N. Cederquist, J. R. Fienup, C. C. Wackerman, S. R. Robinson, and D. Kryskowski, "Wavefront phase estimation from Fourier intensity measurements", J. Opt. Soc. Am. A 6, 1020-1026 (1989), or R. G. Paxman, T. J. Schulz, J. R. Fienup, "Joint estimation of object and aberrations by using phase diversity", J. Opt. Soc. Am. A 9, 1072-1085 (1992).

A major drawback of methods of this type is that they make use of digital Fourier transforms (for calculations of the type involving optical propagation from A to B in the search for the solution) which potentially involves a long calculation time (typically much longer than 1 s).

In the system according to the invention, a major simplification of the phase calculation is due to the calculation of the electromagnetic field distribution in plane B from that of plane A being achieved through a simple product via a known matrix.

Specifically, for M laser beams considered in A, the electric field distribution in A may, according to the parity of M, be written as:

$$E_A(x) = e^{-(\frac{x}{\omega})^2} * \left( \sum_{k=-N}^{+N} e^{i\varphi_k} \delta(x-kP) \right)$$

if M=2N+1, or:

$$E_A(x) = e^{-(\frac{x}{\omega})^2} * \left( \sum_{k=-N+1}^{+N} e^{i\varphi_k} \delta(x-kP) \right)$$

if M=2N.
Or else:

$$E_A(x) = e^{-(\frac{x}{\omega})^2} * \left( \sum_{k=-\infty}^{+\infty} \alpha_k e^{i\varphi_k} \delta(x-kP) \right)$$

where:
- $\omega$ is the waist of the beams (assumed to be Gaussian) in plane A;
- P is the period of the positions of the beams in plane A;
- $\alpha_k$ is the weighting coefficient in terms of amplitude of the $k^{th}$ beam (in this instance for example, $\alpha_k=1$ for k between -N and +N for M=2N+1 and k between -N+1 and +N for M=2N, and $\alpha_k=0$ otherwise);
- $\phi_k$ is the optical phase of the $k^{th}$ beam;
- $\delta$ is the Dirac function and * is the convolution operator.

The field in the plane of the DOE is obtained via Fourier transform of $E_A(x)$ and multiplication by the transmission function in terms of phase of the DOE, $e^{i\varphi_{DOE}(u)}$:

$$E_{DOE}(u) = \frac{1}{p} e^{-(\pi u \omega)^2} \times e^{i\varphi_{DOE}(u)} \times \left( \sum_{k=-\infty}^{+\infty} \alpha_k e^{i\varphi_k} e^{-2i\pi ukP} \right)$$

The field propagated up to the measurement plane (plane B) is obtained once more via the Fourier transform of $E_{DOS}(u)$:

$$E_B(x) = \left[ e^{-(\frac{x}{\omega})^2} * \mathcal{F}(e^{i\varphi_{DOE}(u)}) \right] * \sum_{k=-\infty}^{+\infty} \alpha_k e^{i\varphi_k} \delta(x+kP)$$

Moreover, as the phase of the DOE is, by its construction, a periodic function with a period of 1/P (u being considered to be in the far field), $e^{i\varphi_{DOE}(u)}$ may be written in the form of its Fourier series:

$$e^{i\varphi_{DOE}(u)} = \sum_{k=-\infty}^{+\infty} c_k e^{2i\pi ukP}$$

and hence:

$$E_B(x) = e^{-\left(\frac{x}{\omega}\right)^2} * \left[\sum_{h=-\infty}^{+\infty} \alpha_h e^{i\varphi_h} \delta(x+hP) * \sum_{k=-\infty}^{+\infty} c_k \delta(x-kP)\right]$$

$$= e^{-\left(\frac{x}{\omega}\right)^2} * \left[\sum_{h=-\infty}^{+\infty} \alpha_h e^{i\varphi_h} \times \sum_{k=-\infty}^{+\infty} c_k \delta(x-(k-h)P)\right]$$

$$= e^{-\left(\frac{x}{\omega}\right)^2} * \left[\sum_{k=-\infty}^{+\infty} \left(\sum_{h=-\infty}^{+\infty} c_{k+h}\alpha_h e^{i\varphi_h}\right) \times \delta(x-kP)\right]$$

$$= \sum_{k=-\infty}^{+\infty} \left(\sum_{h=-\infty}^{+\infty} c_{k+h}\alpha_h e^{i\varphi_h}\right) \times e^{-\left(\frac{x-kP}{\omega}\right)^2}$$

A combining DOE is calculated for combining M beams into one. In contrast, a single beam diffracted by the same DOE will essentially produce M beams (referred to as main beams) whose intensity is of the same order ($\approx I_1$), and an infinite number of higher orders of lesser intensity $I_2$ ($I_2 \ll I_1$). Stated otherwise, this implies the following relationships for the coefficients $c_k$:

$|c_k|^2 = 1/M$ for k between −N and +N for M=2N+1 and k between −N+1 and +N for M=2N, $|c_k|^2 \ll 1/M$ otherwise.

The terms $c_{k+h}\alpha_h$ of the expression for $E_B(X)$ above could therefore have non-negligible values for:

$[-N \le k+h \le +N] \cup [-N \le h \le +N]$ for M=2N+1 or $[-N+1 \le k+h \le +N] \cup [-N+1 \le h \le +N]$ for M=2N.

Or:

$k \in \{-2N, \ldots, +2N\}$ for M=2N+1 or $k \in \{-2N+1, \ldots, +2N\}$ for M=2N.

In general, the expression for $E_B(x)$ could therefore be considered to be exact for indices k and h truncated from −2N to +2N for M=2N+1:

$$E_B(x) = \sum_{k=-2N}^{+2N} \left(\sum_{h=-2N}^{+2N} c_{k+h}\alpha_h e^{i\varphi_h}\right) \times e^{-\left(\frac{x-kP}{\omega}\right)^2}$$

or −2N+1 to +2N for M=2N:

$$E_B(x) = \sum_{k=-2N+1}^{+2N} \left(\sum_{h=-2N+1}^{+2N} c_{k+h}\alpha_h e^{i\varphi_h}\right) \times e^{-\left(\frac{x-kP}{\omega}\right)^2}$$

The expression for a matrix product is then identified and written out below for the case of M=2N+1:

$$\begin{vmatrix} E_{B,-2N} \\ \vdots \\ E_{B,0} \\ \vdots \\ E_{B,+2N} \end{vmatrix} = \begin{pmatrix} c_{-4N} & \ldots & c_{-2N} & \ldots & c_0 \\ \vdots & \ddots & \vdots & \ddots & \vdots \\ c_{-2N} & \ldots & c_0 & \ldots & c_{2N} \\ \vdots & \ddots & \vdots & \ddots & \vdots \\ c_0 & \ldots & c_{2N} & \ldots & c_{4N} \end{pmatrix} \times \begin{vmatrix} \alpha_{-2N} e^{i\varphi_{-2N}} \\ \vdots \\ \alpha_0 e^{i\varphi_0} \\ \vdots \\ \alpha_{+2N} e^{i\varphi_{+2N}} \end{vmatrix}$$

Or:

$$\begin{vmatrix} E_{B,-2N} \\ \vdots \\ E_{B,0} \\ \vdots \\ E_{B,+2N} \end{vmatrix} = H_{DOE} \times \begin{vmatrix} E_{A,-2N} \\ \vdots \\ E_{A,0} \\ \vdots \\ E_{A,+2N} \end{vmatrix}$$

Where $E_{A,k}$ (and $E_{B,k}$, respectively) are the complex weighting coefficients of the field $E_A(x)$ (and $E_B(x)$, respectively) such that, in the vicinity of x=kP:

$$E_A(x) = E_{A,k} \times e^{-\left(\frac{x-kP}{\omega}\right)^2}$$

$$E_B(x) = E_{B,k} \times e^{-\left(\frac{x-kP}{\omega}\right)^2}$$

$H_{DOE}$ is the matrix defined by the coefficients $c_k$ of the development of the phase of the DOE, taken over one period, into a Fourier series. This matrix is therefore known a priori through construction of the DOE. As seen above, in practice, with a DOE calculated for combining M laser beams, where odd M is equal to 2N+1, 2M−1 coefficients are required in the Fourier series in order to achieve equality:

$$e^{i\varphi_{DOE}(u)} = \sum_{k=-2N}^{+2N} c_k e^{2i\pi ukP}$$

For even M equal to 2N, 2M coefficients are then required to have:

$$e^{i\varphi_{DOE}(u)} = \sum_{k=-2N+1}^{+2N} c_k e^{2i\pi ukP}$$

Figure 3A:
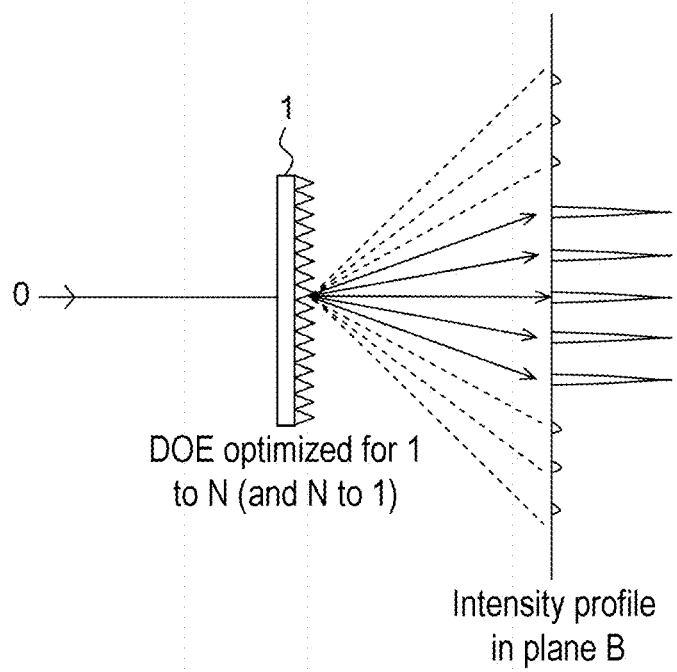
FIGS. 3a and 3b schematically show an intensity profile for a diffractive optical element used as a beam splitter from 1 to M (from 1 to 5 in the example of the figure) (FIG. 3a), or used as a means for combining beams from M to 1 (from 5 to 1 in the example of the figure) where the distribution of intensities is diffracted by the diffractive optical element.
Figure 3B:
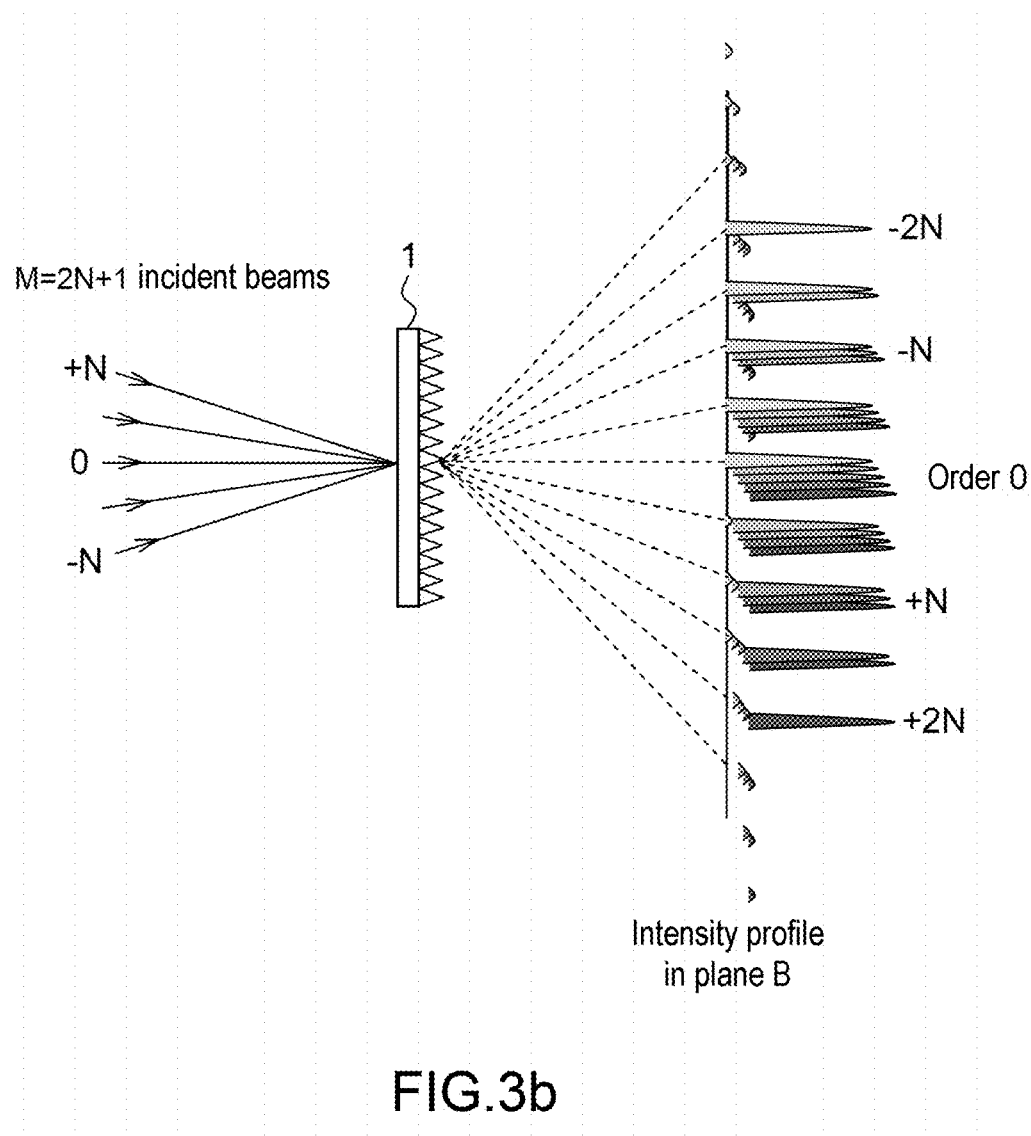

This non-restrictive choice of 2M−1 coefficients in the case of M=2N+1 is also illustrated in FIGS. 3a and 3b on account of the fact that only the diffracted orders of order −2N to +2N (namely in plane B in the vicinity of x=kP for $k \in \{-2N, \ldots, 2N\}$) have an intensity that is of significance for the calculation.

The optical propagation of M beams from plane A to plane B is therefore calculated via the simple product of a matrix of size (2M−1)×(2M−1) if M is odd and 2M×2M if M is even (matrix $H_{DOE}$) with the vector $E_A$. The Fourier transforms used in the usual methods have been replaced by this matrix $H_{DOE}$. Hence the calculation of the electromagnetic field distribution in plane A from that detected in plane B by the matrix of photodetectors is achieved through a simple product of the inverse of this matrix $H_{DOE}$ with this intensity distribution detected in plane B.

From the electromagnetic field distribution thus calculated in plane A, the phase is calculated in the conventional manner. This simplified calculation of the electromagnetic field distribution in plane A substantially speeds up the phase calculation algorithms (=calculating the negative feedback signal), for example of iterative or search for a maximum type, and allows these means for calculating the negative feedback signal to be implemented in real-time, even for many thousands of beams. As exemplary iterative phase calculations, the calculations described in the following publications may be cited:

J. Markham and J. A. Conchello, "Parametric blind deconvolution: a robust method for the simultaneous estimation of image and blur", J. Opt. Soc. Am. A 16(10), 2377-2391(1999);

J. R. Fienup, "Phase retrieval algorithms: a comparison", Appl. Opt. 21(15), 2758-2769(1982).

In the examples, the combining DOE operates by transmission, but the system according to the invention remains valid when using a reflecting DOE.

The invention claimed is:

1. A system for phasing M laser sources of the same wavelength centered around $\lambda_0$, having a periodic spatial configuration, M being an integer >2, which comprises:
    means for collimating and directing the M beams arising from the sources onto a combining diffractive optical element with a periodic phase grating, with an angle of incidence $\theta_{2k}$ that differs from one beam to the next, these angles of incidence being determined according to the period of the grating; and
    means for controlling the phases of said sources based on a negative feedback signal arising from the combined beams;
    means for drawing off a fraction of the combined beams;
    on the path of this fraction of the combined beams, a Fourier lens having an object plane and an image plane, with the combining diffractive optical element in its object plane;
    a matrix of detectors in the image plane of the Fourier lens, capable of detecting intensity distributions of the fraction of the combined beams;
comprising:
    means for calculating the negative feedback signal based on these intensity distributions which comprise means for calculating the product of the distribution of the intensities detected in the plane of the matrix of detectors through the inverse of a matrix of size $(2M-1)\times(2M-1)$ if M is odd and $2M\times2M$ if M is even, defined by coefficients obtained through developing the phase of the combining diffractive optical element, taken over one period, into Fourier series.

2. The system for phasing laser sources as claimed in claim 1, wherein the laser sources are pulsed.

3. The system for phasing laser sources as claimed in claim 2, wherein the pulse width is less than $10^{-12}$ s.

4. The system for phasing laser sources as claimed in claim 1, wherein in that M>100.

5. The system for phasing laser sources as claimed in claim 1, wherein the drawn-off fraction is <1/M.

6. The system for phasing laser sources as claimed in claim 1, wherein the sources are arranged in a one- or two-dimensional spatial configuration.

7. The system for phasing laser sources as claimed in claim 1, wherein as the beams arising from the laser sources have one and the same exit plane, it comprises another Fourier lens having an object plane in which the exit plane of the laser sources is located and an image plane in which the combining diffractive optical element is located.

* * * * *